(12) United States Patent
Li et al.

(10) Patent No.: US 12,355,765 B2
(45) Date of Patent: Jul. 8, 2025

(54) DEVICE, SYSTEM, AND METHOD TO LOG A COMMUNICATION DEVICE INTO SERVICES USING A DEVICE IDENTIFIER

(71) Applicant: MOTOROLA SOLUTIONS, INC., Chicago, IL (US)

(72) Inventors: Hua Li, Plantation, FL (US); Sean Regan, Delray Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 187 days.

(21) Appl. No.: 18/232,879

(22) Filed: Aug. 11, 2023

(65) Prior Publication Data

US 2025/0055844 A1    Feb. 13, 2025

(51) Int. Cl.
*H04L 29/06* (2006.01)
*H04L 9/08* (2006.01)
*H04L 9/32* (2006.01)
*H04L 9/40* (2022.01)

(52) U.S. Cl.
CPC ........ *H04L 63/0876* (2013.01); *H04L 9/0891* (2013.01); *H04L 9/3213* (2013.01); *H04L 9/3268* (2013.01); *H04L 63/0823* (2013.01)

(58) Field of Classification Search
CPC .................................................. H04L 63/0876
See application file for complete search history.

(56) References Cited

U.S. PATENT DOCUMENTS

| | | | |
|---|---|---|---|
| 7,548,620 B2 | 6/2009 | Popp | |
| 10,387,980 B1 * | 8/2019 | Shahidzadeh | ........ G06Q 40/123 |
| 10,764,276 B2 | 9/2020 | deBoer | |
| 10,873,468 B2 | 12/2020 | Melo et al. | |
| 11,622,276 B1 * | 4/2023 | Wan | ..................... H04W 12/50 |
| | | | 455/411 |
| 2013/0318343 A1 * | 11/2013 | Bjarnason | ........... H04L 41/0809 |
| | | | 713/157 |
| 2017/0164193 A1 * | 6/2017 | Bicket | ................... H04W 84/18 |
| 2020/0145409 A1 | 5/2020 | Pochuev et al. | |

* cited by examiner

*Primary Examiner* — Bradley W Holder

(74) *Attorney, Agent, or Firm* — PERRY + CURRIER INC.

(57) ABSTRACT

A device, system and method to log a communication device into services using a device identifier is provided. An identity management (IM) computing device receives, from a certificate authority, a first digital certificate, and further receives from a given communication device, a second digital certificate and a device identifier associated with the given communication device. The IM computing device successfully validates the second digital certificate using the first digital certificate, obtains a user identifier associated with the device identifier, and issues, to the given communication device, one or more tokens that include the user identifier, the one or more tokens enabling the given communication device to log into one or more services using the user identifier.

18 Claims, 7 Drawing Sheets

DEVICE, SYSTEM, AND METHOD TO LOG A COMMUNICATION DEVICE INTO SERVICES USING A DEVICE IDENTIFIER

BACKGROUND OF THE INVENTION

Logging into a communication device, and/or services provided via the communication device, may require that a user enter credentials at the communication device, such as a username and a password. However, for some first responders, such as fire fighters, such a login may be challenging as they may be wearing gloves, which may make it difficult to enter the credentials. In some mission critical situations, it may not be possible to remove such gloves to enter the credentials.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
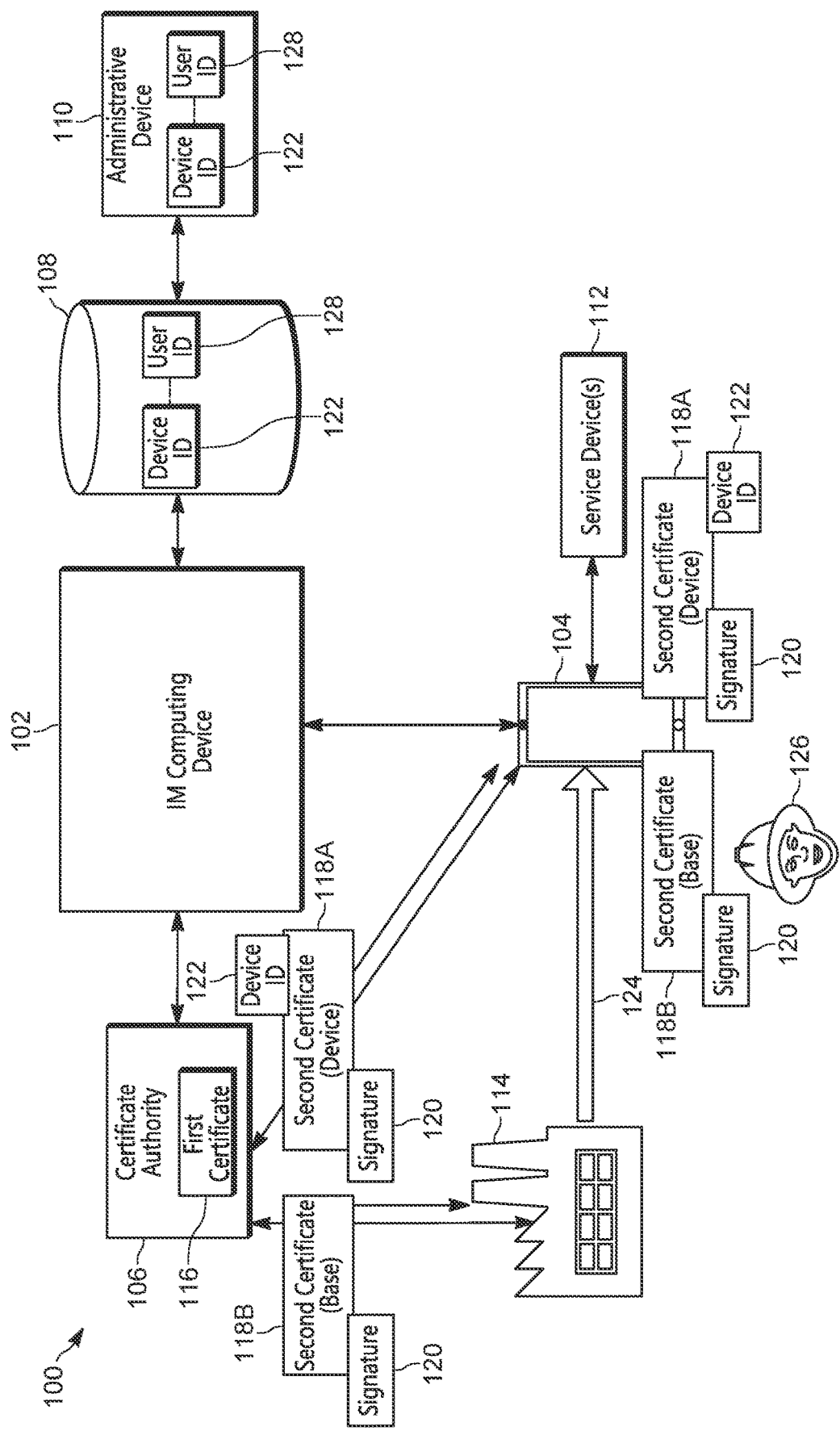
FIG. 1 is a system to log a communication device into services using a device identifier, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Logging into a communication device, and/or services provided via the communication device, may require that a user enter credentials at the communication device, such as a username and a password. However, for some first responders, such as fire fighters, such a login may be challenging as they may be wearing gloves, which may make it difficult to enter the credentials. In some mission critical situations, it may not be possible to remove such gloves to enter the credentials. Thus, there exists a need for an improved technical method, device, and system to log a communication device into services using a device identifier.

Hence, provided herein is a device, system and method to log in a given communication device to services using a device identifier. In particular, a system is provided that includes an identity management (IM) computing device, a certificate authority, a given communication device, a memory, and an administrative device. The certificate authority may issue root certificates, and the like, which may be used to sign certificates, and the like. For example, a base certificate, signed by a root certificate, may be provided to a factory which at least configures the given communication device with the base certificate. Alternatively, and/or in addition, a device certificate, signed by the root certificate, may be requested from the certificate authority by the given communication device (e.g., using the base certificate to validate the request): in these examples, the device certificate may include a device identifier associated with the given communication device. Indeed, the given communication device may be configured with both a base certificate and a device certificate.

The administrative device may further have access to the device identifier associated with the given communication device, such as a serial number, and the like of the given communication device, as well a user identifier of a user associated with the given communication device. The user identifier may comprise an email address, a user identifier, and/or any other suitable identifier that may be used to log the user into the given communication device and services provided via the given communication device. The administrative device may populate the memory with the device identifier in association with the user identifier. The device identifier is understood to be stored at the given communication device.

The IM computing device is in communication with the certificate authority and hence has access to the root certificate. Furthermore, the IM computing device has access to the memory storing the device identifier in association with the user identifier.

When the given communication device is turned on (and/or for any event that occurs at the given communication device where a log in event is to occur including, but not limited to, expiry of tokens as described herein), the given communication device may provide, to the IM computing device, the base certificate and/or the device certificate, and the device identifier. Indeed, hereafter, reference will be made to the given communication device providing the device certificate to the IM computing device as often base certificates are not shared by communication devices. Nonetheless, a base certificate may be used in place of a device certificate as described herein, as long as the device identifier is provided to the IM computing device with the base certificate. The device certificate is understood to have the device identifier incorporated therein.

The IM computing device may receive the device certificate and the device identifier from the given communication device, and validate the device certificate using the root certificate. For example, as the device certificate is signed by the root certificate, a signature of the root certificate at the device certificate may be used to determine that the device certificate is signed by the root certificate (e.g., by comparing the signature, of the root certificate, to the root certificate in any suitable manner).

In response to successfully validating the device certificate, the IM computing device may obtain from the memory, using the device identifier, the user identifier.

The user identifier may be used by the IM computing device to issue one or more tokens to the given communication device that include the user identifier. The one or more tokens may be used by the given communication device to log into one or more services using the user identifier.

Hence, the device identifier, along with the root certificate and the device certificate, may be used by the given communication device to log into one or more services. From the point of view of the user of the given communication device, turning on the given communication device, and the like, results in an automatic, and authenticated log-in of the user into the given communication device using their user identifier (e.g., without the user having to enter the user identifier).

An aspect of the present specification provides a method comprising: receiving, at an identity management (IM) computing device, from a certificate authority, a first digital certificate: receiving, at the IM computing device, from a given communication device, a second digital certificate and a device identifier of the given communication device: validating, at the IM computing device, the second digital certificate using the first digital certificate: in response to successfully validating the second digital certificate, obtaining, at the IM computing device, from a memory storing device identifiers in association with respective user identifiers, a user identifier associated with the device identifier; and issuing, from the IM computing device, to the given communication device, one or more tokens that include the user identifier, the one or more tokens enabling the given communication device to log into one or more services using at least one of the user identifier and the one or more tokens.

Another aspect of the present specification provides an identity management (IM) computing device comprising: a communication interface: a controller; and a computer-readable storage medium having stored thereon program instructions that, when executed by the controller, cause the controller to perform a set of operations comprising: receiving, from a certificate authority, a first digital certificate: receiving, via the communication interface, from a given communication device, a second digital certificate and a device identifier of the given communication device; validating the second digital certificate using the first digital certificate: in response to successfully validating the second digital certificate, obtaining, from a memory storing device identifiers in association with respective user identifiers, a user identifier associated with the device identifier; and issuing, via the communication interface, to the given communication device, one or more tokens that include the user identifier, the one or more tokens enabling the given communication device to log into one or more services using at least one of the user identifier and the one or more tokens.

A further aspect of the present specification provides a system comprising: a memory storing device identifiers in association with respective user identifiers: an identity management (IM) computing device comprising: a first controller; and a first computer-readable storage medium having stored thereon first program instructions that, when executed by the first controller, cause the IM computing device to perform a first set of operations: a given communication device comprising: a second controller; and a second computer-readable storage medium having stored thereon second program instructions that, when executed by the second controller, cause the given communication device to perform a second set of operations, wherein the first set of operations comprises: receiving, at the IM computing device, from a certificate authority, a first digital certificate: receiving, at the IM computing device, from the given communication device, a second digital certificate and a device identifier of the given communication device: validating, at the IM computing device, the second digital certificate using the first digital certificate: in response to successfully validating the second digital certificate, obtaining, at the IM computing device, from the memory, a user identifier associated with the device identifier; and issuing, from the IM computing device, to the given communication device, one or more tokens that include the user identifier; and wherein the second set of operations comprises: providing, from the given communication device, to the IM computing device, the second digital certificate and the device identifier: receiving, at the given communication device, from the IM computing device, the one or more tokens that include the user identifier; and logging into one or more services using at least one of the user identifier and the one or more tokens.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 to log a communication device into services using a device identifier. The various components of the system 100 are in communication via any suitable combination of wired and/or wireless communication links, and communication links between components of the system 100 are depicted in FIG. 1, and throughout the present specification, as double-ended arrows between respective components: the communication links may include any suitable combination of wireless and/or wired links and/or wireless and/or wired communication networks, and the like.

The system 100 comprises an identity management (IM) computing device 102, a given communication device 104, a certificate authority 106, a memory 108, an administrative device 110, one or more service devices 112, and a factory 114.

In general, the IM computing device 102 is in communication with the given communication device 104, the certificate authority 106, and the memory 108. The administrative device 110 is in communication with the memory 108. The given communication device 104 is in communication with the IM computing device 102, optionally the certificate authority 106, and the one or more service devices 112. The certificate authority 106 is in communication with the IM computing device 102, optionally the given communication device 104, and the factory 114 (e.g., a computing and/or a provisioning device thereof).

Figure 2:
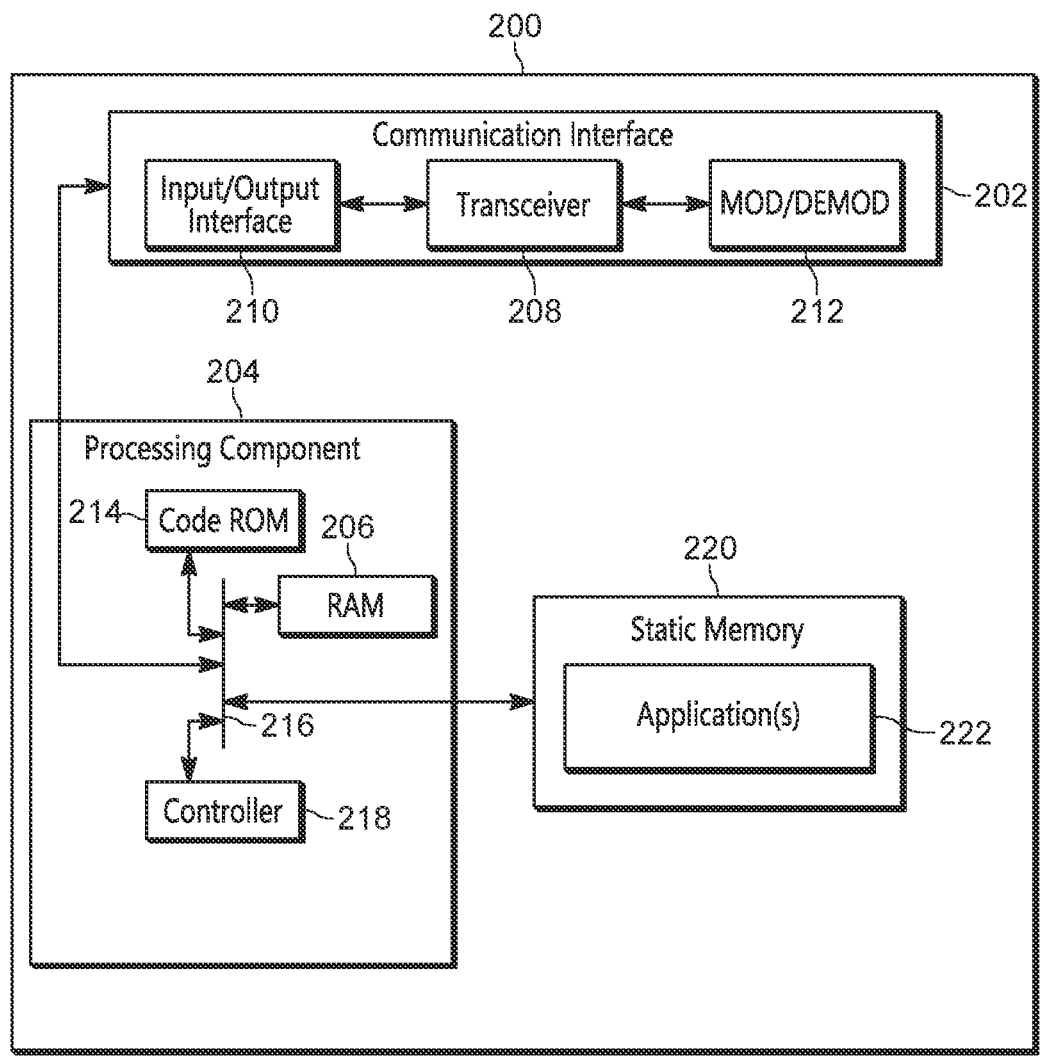
FIG. 2 is a device diagram showing a device structure of a computing device to log a communication device into services using a device identifier, in accordance with some examples.

A general example hardware structure for the various components of the system 100 is described with respect to FIG. 2, and some specific functionality of the various components of the system 100 is next described.

The IM computing device 102 may comprise any suitable combination of servers, cloud computing devices, virtual machines, and the like generally configured to manage identity for the given communication device 104, as well as any other suitable number of given communication devices (not depicted).

The given communication device 104 may comprise any suitable communication device including, but not limited to, a cell phone (e.g., as depicted), a radio, a land mobile radio, and the like, though the given communication device 104 may comprise other types of communication devices which may, or may not, be mobile, including, but not limited to, a laptop, a tablet, a personal computer, a computer terminal, and the like.

The certificate authority 106 may comprise any suitable combination of servers, cloud computing devices, virtual machines, and the like generally configured to issue certificates (e.g., digital certificates and/or secure sockets layer (SSL) certificates), and the like, including, but not limited to, root certificates, base certificates, device certificates, and the like. For example, as depicted, the certificate authority 106 has issued a first digital certificate 116 and a second digital certificate 118A and/or a second digital certificate 118B (interchangeably referred to hereafter, collectively, as the second digital certificates 118, and, generically, as a second digital certificate 118) signed by the first digital certificate 116, as represented, at the second digital certificates 118, as a signature 120 of the first digital certificate 116. Such certificates 116, 118 are understood to comprise data files used to cryptographically link an entity and/or a device (e.g., such as the given communication device 104) with a public key, and the like.

It is understood that the first digital certificate 116 may comprise a root certificate, and the second digital certificate 118 may comprise a device certificate or a base certificate. In general, the first digital certificate 116 and the second digital certificate(s) 118 may form a validation chain, with the first digital certificate 116 comprising a trust anchor of the validation chain. While either a base certificate and/or a device certificate may be used in processes provided herein to log a communication device (e.g., the given communication device 104) into services using a device identifier, in general, components of the system 100 may rely on a device certificate for such processes.

In examples where the second digital certificate 118 comprises a device certificate (e.g., the second digital certificate 118A) associated with the given communication device 104, the device certificate may be requested, from the certificate authority 106 by the given communication device 104, for example using the base certificate (e.g., as provisioned at the given communication device 104 by the factory 114 as described hereafter), to authenticate with the certificate authority 106. For example, the certificate authority 106 may generate the device certificate, incorporating a device identifier 122 therein, sign the device certificate using the first digital certificate 116, and provide the device certificate to the given communication device 104. The device identifier 122 may be provided to the certificate authority 106 by the given communication device 104 when requesting the device certificate.

The device identifier 122 may be provisioned at the given communication device 104 by the factory 114, and/or another facility where components of the given communication device 104 may be manufactured. The device identifier 122 may comprise any suitable string of characters, and the like, and/or any other suitable identifier, that identifies, and/or uniquely identifies, the given communication device 104, at least in the system 100. The device identifier 122 may include, but is not limited to, a serial number, a media access control (MAC) address, and the like.

In some examples, the device identifier 122 may alternatively, or additionally, be generated by another component of the system 100, including, but not limited to, the administrative device 110, and hence the administrative device 110 may provision the given communication device 104 with the device identifier 122.

In examples where the second digital certificate 118 comprises a base certificate (e.g., the second digital certificate 118B) associated with the given communication device 104, the certificate authority 106 may provide the second digital certificate 118B (e.g., as signed by the first digital certificate 116) to the factory 114, for example upon request from the factory.

The factory 114 is understood to be generally configured to at least partially provision the given communication device 104 with various data, which may include, but is not limited to, a base certificate and the device identifier 122, and ship (e.g., as represented by an arrow 124), and the like, the given communication device 104, such that the given communication device 104 may be used by a user 126. As depicted, the user 126 comprises a first responder (e.g., a fire fighter (as depicted), a police officer, an emergency medical technician, and the like, amongst other possibilities), though the given communication device 104 may be used by any suitable user.

Hence, as depicted, regardless of a process for obtaining the second digital certificate 118, the given communication device 104 has been provisioned with a second digital certificate 118 (e.g., as depicted both the second digital certificates 118A, 118B), which includes the signature 120 of the first digital certificate 116, and a device identifier 122. It is understood that, as depicted, the given communication device 104 may be provisioned with both a device certificate (e.g., the second digital certificate 118A) and a base certificate (e.g., the second digital certificate 118B). However, in some examples, the device certificate may be optional.

Alternatively, in examples where the second digital certificate 118 comprises a device certificate, the factory 114 may request the device certificate from the certificate authority 106 and provide the device identifier 122 to the certificate authority 106, which may generate the device certificate, incorporating the device identifier 122 therein, and sign the device certificate using the first digital certificate 116. The factory 114 may receive the device certificate and provision the given communication device 104 accordingly.

The memory 108 may comprise any suitable combination of memories, databases, and the like. The memory 108 may comprise a stand-alone memory and/or database, or the memory 108 may be a component of one or more of the IM computing device 102 and the administrative device 110.

The administrative device 110 may comprise any suitable combination of servers, cloud computing devices, virtual machines, and the like generally configured to at least provision the memory 108 with device identifiers in association with respective user identifiers.

For example, it is understood that the user 126 of the given communication device 104 may be associated with a user identifier 128 which may include, but it not limited to, an email address, or other network address, an employee number, a badge number, an alphanumeric string, and the like, amongst other possibilities. Indeed, the user 126 may be an employee of an entity that administers at least a portion of the system 100, including, but not limited to, the IM computing device 102, the given communication device 104, the certificate authority 106, the memory 108, the administrative device 110, and one or more of the service devices 112. When an entity that administers at least a portion of the system 100 administers the certificate authority 106, the first digital certificate 116 may be used to generate and/or sign base certificates and/or digital certificates for a plurality of given communication devices, including the given communication device 104, administered by the entity, for example, as the trust anchor for a plurality of validation chains for the plurality of given communication devices.

For example, when the given communication device 104 is shipped from the factory 114, the given communication device 104 may be received by an employee of the entity that administers at least a portion of the system 100. Such an entity may issue the given communication device 104 to the user 126, and operate the administrative device 110 to store the device identifier 122, in association with the user identifier 128, at the memory 108, for example in a database format, and/or any other suitable format. It is further understood that such an entity may issue a plurality of given communication devices, including the communication device 104, to a plurality of users, including the user 126, and that methods described herein may occur in association with such a plurality of given communication devices.

As such, it is understood that the administrative device 110 may be provided with the device identifier 122, the user identifier 128, and any suitable information that indicates the device identifier 122 and the user identifier 128 are associated. Such an association may be at least by virtue of the user 126, associated with the user identifier 128, having been assigned the given communication device 104 for use within the system 100. In some examples, the administrative device 110 may generate the device identifier 122 and/or the user identifier 128. Regardless, the administrative device 110 may populate the memory 108 with the device identifier 122 stored in association with the user identifier 128.

While only one given communication device 104, one user 126, one device identifier 122 and one user identifier 128 is depicted, as has previously been described, it is understood that the system 100 may comprise a plurality of given communication devices and associated users, as well as associated device identifiers and user identifiers stored at the memory 108.

In general, it is understood that the user identifier 128 may be used to log into the given communication device 104. More specifically, the user identifier 128 may be used to log the given communication device 104 into one or more services provided via the given communication device 104, such as one or more applications, and the like, executed by the given communication device 104, which may act as one or more portals to respective service devices 112, such that the user identifier 128 may be used to log into the one or more service devices 112.

A service device 112 may comprise any suitable combination of servers, cloud computing devices, virtual machines, and the like generally configured to provide a service to the given communication device 104, for example upon logging into the service device 112 via the user identifier 128, as described herein. Such services may include, but are not limited to, first responder services and/or applications, mapping services and/or applications, tracking services and/or applications, social media services and/or applications, and the like, amongst other possibilities.

However, one or more applications, and the like, executed by the given communication device 104, may provide a service at the given communication device 104 without interacting with a service device 112. Hence, the one or more service devices 112 may be optional. Hence, while hereafter, for simplicity, the given communication device 104 is referred to as logging into one or more services via the one or more service devices 112, it is understood that the given communication device 104 logging into one or more services may include or exclude logging into the one or more service devices 112.

It is further understood that the user identifier 128 may be entered, by the user 126, for example along with a password and/or any other suitable credentials, at an input component of the given communication device 104, which logs the user 126 into the given communication device 104, as well as any services represented at least by the one or more service devices 112.

However, as the user 126 may be wearing gloves, logging into the given communication device 104 using the user identifier 128 may be challenging, and/or as the user 126 may be a first responder in a mission critical situation, and the like, stopping to remove glove to log into the given communication device 104, and/or even taking time to log into the given communication device 104, may lead to unnecessary and/or even critical delays in dealing with the mission critical situation.

As such, when the given communication device 104 is turned on, and the like, the given communication device 104 may provide, to the IM computing device 102, the second digital certificate 118 (e.g., with the signature 120) and the device identifier 122.

The IM computing device 102 may receive the second digital certificate 118 (e.g., with the signature 120) and the device identifier 122 and validate the second digital certificate 118 using the first digital certificate 116, which the IM computing device 102 may receive from the certificate authority 106 (e.g., and store in the memory 108 and/or another memory). For example, validating the second digital certificate 118 using the first digital certificate 116 may comprise determining that the second digital certificate 118 is signed using the first digital certificate 116, as indicated by the signature 120.

When the validation of the second digital certificate 118 is successful, the IM computing device 102 may retrieve the user identifier 128 from the memory 108 using the device identifier 122 received from the given communication device 104, for example in a database lookup, and the like.

The IM computing device 102 may issue one or more tokens to the given communication device 104, the one or more tokens including the user identifier 128, the one or more tokens enabling the given communication device 104 to log into one or more services using at least one of the user identifier 128 and the one or more tokens.

Attention is next directed to FIG. 2, which depicts a schematic block diagram of an example of an example computing and/or communication device 200 (interchangeably referred to hereafter, for simplicity, as the computing device 200). The computing device 200 may represent a structure of any suitable component of the system 100, including, but not limited to, the IM computing device 102, the given communication device 104, the certificate authority 106, the administrative device 110 and a service device 112.

While the computing device 200 is depicted in FIG. 2 as a single component, when the computing device 200 represents a structure of the IM computing device 102, the certificate authority 106, the administrative device 110 and a service device 112, functionality of the computing device 200 may be distributed among a plurality of components and the like including, but not limited to, any suitable combination of one or more servers, one or more cloud computing devices, and the like. Furthermore, in such examples, functionality of the IM computing device 102, the certificate authority 106, the administrative device 110 and a service device 112 may be combined in any suitable manner. However, in some examples, functionality of the certificate authority 106 may generally be isolated from other components of the system 100, other than the certificate authority 106 communicating with other components of the system 100 as described herein.

However, when the computing device 200 represents a structure of the given communication device 104, functionality of the computing device 200 may be provided in a single component.

While a computing and/or a provisioning device of the factory 114 is not depicted, it is understood that such a computing and/or provisioning device of the factory 114 may also be represented by the computing device 200.

As depicted, the computing device 200 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 200 may have any suitable structure and/or configuration.

Furthermore, when the computing device 200 represents the IM computing device 102 and/or the administrative device 110, a portion of the memory 220 may comprise the memory 108.

While not depicted, the computing device 200 may include, and/or be in communication with, one or more of an input component and a display screen (and/or any other suitable notification device) and the like.

As shown in FIG. 2, the computing device 200 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that while DMR transceivers, P25 transceivers, and TETRA transceivers may be particular to first responders, in some examples, the system 100 may be operated by a first responder entity (e.g., such as a police department, a fire department, an emergency medical services department, and the like), and hence such transceivers may be used for communications between the IM computing device 102, the given communication device 104, the certificate authority 106 and/or the one or more service devices 112. However, the administrative device 110 may omit such transceivers.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 200 is not a generic controller and/or a generic device, but a device (e.g., the IM computing device 102) specifically configured to implement functionality to log a communication device into services using a device identifier. For example, in some examples, the computing device 200 and/or the controller 218 specifically comprises a computer executable engine configured to implement functionality to log a communication device into services using a device identifier.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 200 as described herein are maintained, persistently, at the memory 220 and used by the controller 218, which makes appropriate utilization of volatile storage during the execution of such programming instructions.

Regardless, it is understood that the memory 220 stores instructions corresponding to the at least one application 222 that, when executed by the controller 218, enables the controller 218 to implement functionality particular to the computing device 200, and which may depend on a type of the computing device 200.

Figure 3:
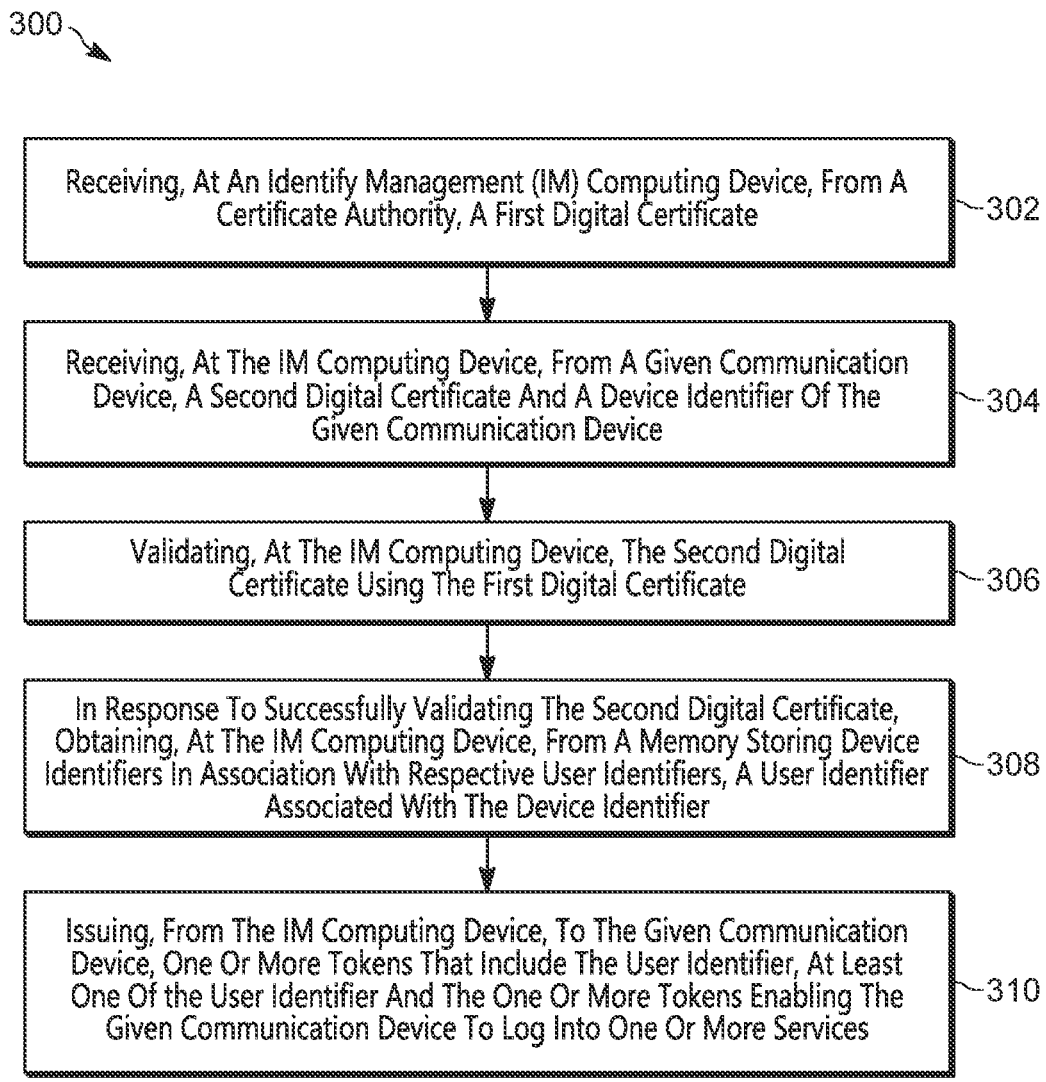
FIG. 3 is a flowchart of a method to log a communication device into services using a device identifier, as implemented at an identity management computing device, in accordance with some examples.

For example, when the computing device 200 represents the IM computing device 102, the memory 220 stores instructions corresponding to the at least one application 222 that, when executed by the controller 218, enables the controller 218 to implement functionality, including, but not limited to, the blocks of the method set forth in FIG. 3.

However, the various components of the system 100 are understood to implement different functionality.

As such, when the computing device 200 represents the IM computing device 102, the IM computing device 102 is understood to comprise: a first controller 218; and a first computer-readable storage medium (e.g., a first memory 220) having stored thereon first program instructions (e.g., a first application 222) that, when executed by the first controller 218, causes the IM computing device 102 to perform a set of operations comprising the blocks of the method set forth in FIG. 3.

Figure 4:
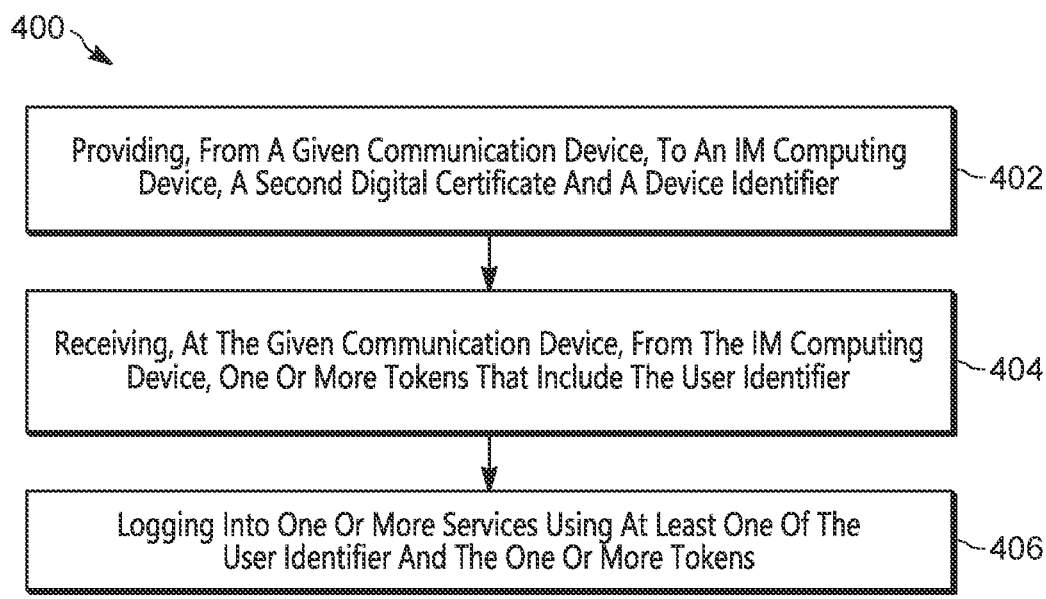
FIG. 4 is a flowchart of a method to log a communication device into services using a device identifier, as implemented at a communication device, in accordance with some examples.

Similarly, when the computing device 200 represents the given communication device 104, the given communication device 104 is understood to comprise: a second controller 218; and a second computer-readable storage medium (e.g., a second memory 220) having stored thereon second program instructions (e.g., a second application 222) that, when executed by the given communication device 104, causes the given communication device 104 to perform a set of operations comprising the blocks of the method set forth in FIG. 4.

Figure 5:
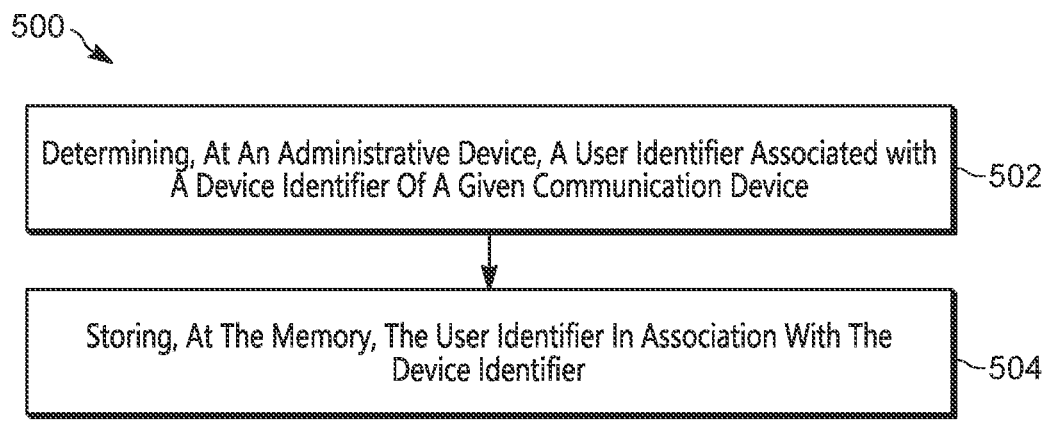
FIG. 5 is a flowchart of a method to provision a memory with a device identifier and an associated user identifier, in accordance with some examples.

Similarly, when the computing device 200 represents the administrative device 110, the administrative device 110 is understood to comprise: a third controller 218; and a third computer-readable storage medium (e.g., a third memory 220) having stored thereon third program instructions (e.g., a third application 222) that, when executed by the administrative device 110, causes the administrative device 110 to perform a set of operations comprising the blocks of the method set forth in FIG. 5.

Figure 6:
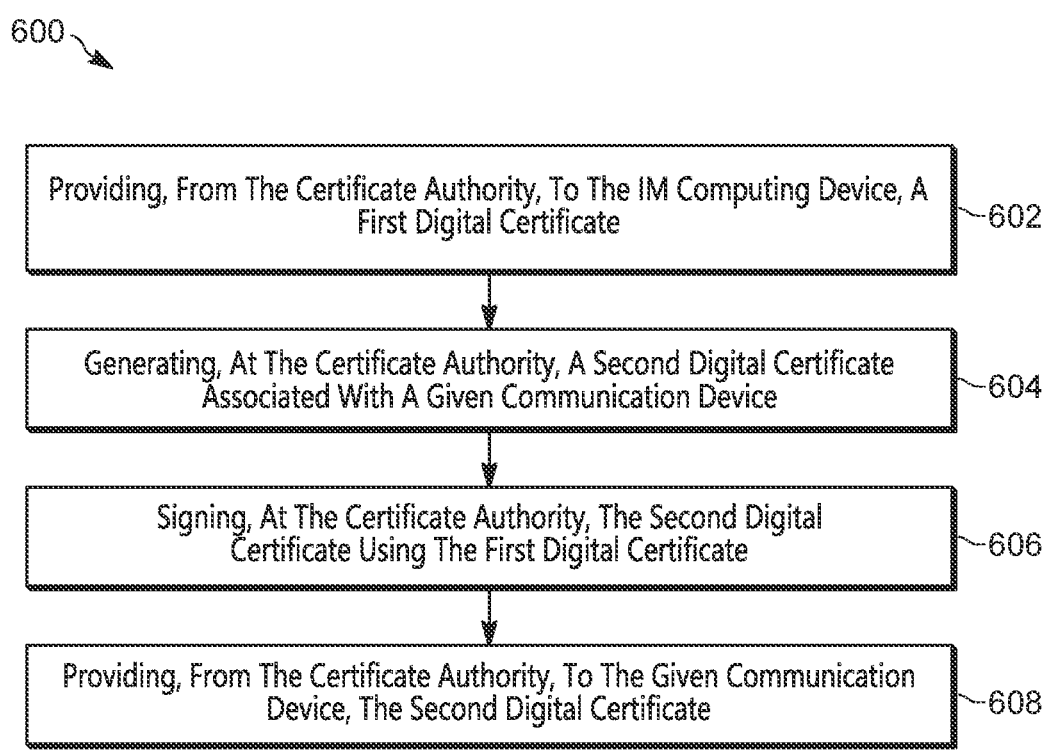
FIG. 6 is a flowchart of a method to issue digital certificates, in accordance with some examples.

Similarly, when the computing device 200 represents the certificate authority 106, the certificate authority 106 is understood to comprise: a fourth controller 218; and a fourth computer-readable storage medium (e.g., a fourth memory 220) having stored thereon fourth program instructions (e.g., a fourth application 222) that, when executed by the certificate authority 106, causes the certificate authority 106 to perform a set of operations comprising the blocks of the method set forth in FIG. 6.

Attention is now directed to FIG. 3, which depicts a flowchart representative of a method 300 to log a communication device into services using a device identifier. The operations of the method 300 of FIG. 3 correspond to machine readable instructions that are executed by the IM computing device 102. The method 300 of FIG. 3 is one way that the IM computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the IM computing device 102, receives, from the certificate authority 106, the first digital certificate 116.

For example, the certificate authority 106 may have issued the first digital certificate 116 as a trust anchor for a plurality of validation chains that include base certificates and/or device certificates for a plurality of given communication devices, including the given communication device 104. Alternatively, the first digital certificate 116 may be specifically issued as a trust anchor for a validation chain associated with the given communication device 104. Alternatively, and/or in addition, the certificate authority 106 may have issued the first digital certificate 116 upon request from the factory 114.

The IM computing device 102 may request the first digital certificate 116 from the certificate authority 106, for example for use in validating digital certificates of validation chains that have the first digital certificate 116 as a trust anchor. In these examples, the IM computing device 102 and the certificate authority 106 may exchange other digital certificates (not depicted) in any suitable manner to establish a secure relationship, and/or exchange of data, therebetween.

More detail of the functionality of the certificate authority 106 is described below with respect to FIG. 6.

Furthermore, in some examples, the block 302 may be implemented at each implementation of the method 300, or the block 302 may be implemented at a first implementation of the method 300, and the first digital certificate 116 may be stored at the memory 108 and retrieved from the memory 108 by the IM computing device 102 at later implementations of the method 300.

Furthermore, as has been previously described, the first digital certificate 116 may comprise a root certificate used to validate other digital certificates in a validation chain, including, but not limited to the second digital certificate(s) 118 associated with the given communication device 104.

At a block 304, the IM computing device 102, receives (e.g., via a communication interface, such as the communication interface 202), from the given communication device 104, a second digital certificate 118 and a device identifier 122 of the given communication device 104.

For example, when the given communication device 104 is turned on, and the like, the given communication device 104 may provide and/or transmit the second digital certificate 118 and the device identifier 122 to the IM computing device 102, for example in a message, and the like.

In some examples, the second digital certificate 118 may comprise a device certificate (e.g., the second digital certificate 118A) associated with the given communication device 104 and issued by the certificate authority 106. In these examples, the device certificate may have the device identifier 122 incorporated therein, such that the device certificate comprises a certificate dedicated to providing the device identifier 122 to the IM computing device 102. It is further understood that the device certificate is signed by the first digital certificate 116.

In other examples, the second digital certificate 118 may comprise a base certificate (e.g., the second digital certificate 118B) associated with the given communication device 104 and issued by the certificate authority 106, the base certificate signed by the first digital certificate 116, for example as represented by the signature 120. In these examples, the second digital certificate 118 and the device identifier 122 may be received as separate items from the given communication device 104 (but in a same message).

More detail of the functionality of the given communication device 104 is described below with respect to FIG. 3.

At a block 306, the IM computing device 102, validates the second digital certificate 118 using the first digital certificate 116.

For example, the IM computing device 102 may successfully validate the second digital certificate using the first digital certificate 116 by: determining that the second digital certificate 118 is signed using the first digital certificate 116. In these examples, the IM computing device 102 may implement any suitable validation process to compare the first digital certificate 116 with the signature 120 of the first digital certificate 116, as incorporated into the second digital certificate 118.

When the validation is not successful, the IM computing device 102 may transmit a message to the given communication device 104 that the validation failed, which may be provided at an output component (e.g., a display screen and/or a speaker) of the given communication device 104, and the method 300 may end. However, after reviewing the message that the validation failed, the user 126 may attempt to log in to the given communication device 104 using any suitable credentials.

At a block 308, the IM computing device 102, in response to successfully validating the second digital certificate 118, obtains, from the memory 108 storing device identifiers in association with respective user identifiers, the user identifier 128 associated with the device identifier 122.

For example, the device identifier 122 received from the given communication device 104 may be used to retrieve the user identifier 128 from the memory 108, using a database lookup process, and the like.

It is furthermore understood that the memory 108 was previously populated with the user identifier 128 as associated with the device identifier 122, by the administrative device 110.

More detail of the functionality of the administrative device 110 is described below with respect to FIG. 5.

At a block 310, the IM computing device 102, issues (e.g., via a communication interface, such as the communication interface 202), to the given communication device 104, one or more tokens that include the user identifier 128, the one or more tokens enabling the given communication device 104 to log into one or more services using at least one of the user identifier 128 and the one or more tokens. Hereafter, references to logging into the given communication device 104 and/or service devices 112 using an access token are understood to include using the user identifier 128 included in the one or more tokens, and/or the one or more tokens, to perform such logging in.

For example, the one or more tokens may include, but are not limited to, an initial access token enabling a log-in process at the given communication device 104 such that the given communication device 104 is initially logged into using the initial access token and/or the user identifier 128 included in the initial access token, and the one or more services are initially logged into using the initial access token and/or the user identifier 128 included in the initial access token.

In some examples, the initial access token may be time limited and/or have an expiry time. In these examples, the one or more tokens may further include, but are not limited to, one or more refresh tokens (e.g., which include the user identifier 128) used by the given communication device 104 to remain logged into the one or more services after a current token expires.

For example, each token, of the one or more tokens, may be valid for only a given time period (e.g., such as 10 minutes, 1 hour, 2 hours, amongst other possibilities), and when a current token expires, a next token is used to again log into the one or more services and/or to remain logged into the one or more services. Hence, when a last token expires, the method 300 may be repeated, at least from the block 304, presuming the IM computing device 102 still has access to the first digital certificate 116; if not, the method 300 may be repeated from the block 302.

Put another way, when all of the one or more tokens expire, the method 300 may be repeated, at least from the block 304 (presuming the IM computing device 102 still has access to the first digital certificate 116: if not, the method 300 is repeated from the block 302). Hence, the block 304 may occur when the given communication device 104 is turned on, or when all of the one or more tokens expire.

Attention is now directed to FIG. 4, which depicts a flowchart representative of a method 400 to log a communication device into services using a device identifier, but implemented at the communication device. For example, the operations of the method 400 of FIG. 4 correspond to machine readable instructions that are executed by the given communication device 104. The method 400 of FIG. 4 is one way that the given communication device 104 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

It is further understood that the method 300 may be implemented in conjunction with the method 300.

At a block 402, the given communication device 104 provides to the IM computing device 102, the second digital certificate 118 and the device identifier 122.

The given communication device 104 may provide, in a message to the IM computing device 102, a device certificate (e.g., the second digital certificate 118A) which includes the device identifier 122. Alternatively, the given communication device 104 may provide, in a message to the IM computing device 102, and the device identifier 122 and a base certificate (e.g., the second digital certificate 118B) which may not include the device identifier 122; in these examples, the device identifier 122 and a base certificate may be provided as separate components of the message.

At a block 404, the given communication device 104 receives from the IM computing device 102, one or more tokens that include the user identifier 128, for example in response to providing, to the IM computing device 102, the second digital certificate 118 and the device identifier 122.

At a block 406, the given communication device 104 logs into one or more services using at least one of the user identifier 128 and the one or more tokens.

As has already been explained the one or more tokens may expire, and after each expiry, the given communication device 104 may again log into the one or more services using a next token and/or the user identifier 128 included in the next token. Furthermore, when all of the one or more tokens expire, the given communication device 104 may repeat the method 400.

Hence, the given communication device 104 may implement the method 400 when initially turned on, and/or when all of the one or more tokens expire, and/or under any other suitable conditions.

In some examples, when the second digital certificate 118 comprises a device certificate, the method 400 may further include (e.g., prior to the given communication device 104 providing to the IM computing device 102, the second digital certificate 118 and the device identifier 122) requesting the device certificate from the certificate authority 106 using, for example, the base certificate to authenticate with the certificate authority 106. In these examples, it is understood that the base certificate has been previously provisioned at the given communication device 104.

In some of these examples, the device identifier 122 may comprise an identifier provisioned at the given communication device 104 at the factory 114, and the like, as has been previously described.

In other examples the device identifier 122 may be received from the administrative device 110. In these examples, the method 400 may further include, prior to the block 402 (e.g., and/or prior to the given communication device 104 requesting a device certificate), the given communication device 104 receiving the device identifier 122 from the administrative device 110

Attention is now directed to FIG. 5, which depicts a flowchart representative of a method 500 to provision a memory with a device identifier and an associated user identifier. The operations of the method 500 of FIG. 5 correspond to machine readable instructions that are executed by the administrative device 110. The method 500 of FIG. 5 is one way that the administrative device 110 and/or the system 100 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

It is further understood that the method 500 may be implemented prior to at least the method 300 being implemented.

At a block 502, the administrative device 110 determines that the user identifier 128 is associated with the device identifier 122 of the given communication device 104.

At a block 504, the administrative device 110 stores and/or registers, at the memory 108, the user identifier 128 in association with the device identifier 122.

The block 502 may occur by way of any suitable combination of one or more registration processes. For example, in a first registration process, the device identifier 122 of the given communication device 104 may be registered with the administrative device 110 as belonging to the entity with which the administrative device 110 is associated: the administrative device 110 may responsively store and/or register the device identifier 122 at the memory 108 (e.g., at the block 504). In a second registration process, the given communication device 104 may be issued to the user 126, and their associated user identifier 128 may registered with the administrative device 110 as being associated with the given communication device 104; the administrative device 110 may responsively store and/or register the user identifier 128 at the memory 108 in association with the device identifier 122 (e.g., at the block 504).

In some examples, the block 502 may include the administrative device 110 generating the device identifier 122 and providing the device identifier 122 to the given communication device 104 in the first registration process: in such examples, the given communication device 104 may request a device certificate from the certificate authority 106 using the device identifier 122 provided by the administrative device 110.

However any suitable registration process is within the scope of the present specification, and need not be a two stage registration process.

Attention is now directed to FIG. 6, which depicts a flowchart representative of a method 600 of issuing digital certificates. The operations of the method 600 of FIG. 6 correspond to machine readable instructions that are executed by the certificate authority 106. The method 600 of FIG. 6 is one way that the certificate authority 106 and/or the system 100 may be configured. Furthermore, the following discussion of the method 600 of FIG. 6 will lead to a further understanding of the system 100, and its various components.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 100 of FIG. 1, as well.

It is further understood that the method 600 may be implemented prior to at least the method 300 being implemented.

At a block 602, the certificate authority 106 provides, to the IM computing device 102, the first digital certificate 116, as has already been described.

At a block 604, the certificate authority 106 generates the second digital certificate 118.

When the second digital certificate 118 comprise a base certificate, generation of the second digital certificate 118 may occur upon request by the factory 114.

Alternatively, when the second digital certificate 118 comprise a device certificate, generation of the second digital certificate 118 may occur upon request by the given communication device 104.

At a block 606, the certificate authority 106 signs the second digital certificate 118 using the first digital certificate 116, for example, as represented by the signature 120.

At a block 608, the certificate authority 106 provides, to the given communication device 104, the second digital certificate 118.

When the second digital certificate 118 comprise a base certificate, the certificate authority 106 may provide the second digital certificate 118 to the given communication device 104 by way of providing the base certificate to the factory 114, which may provision the given communication device 104 accordingly.

Alternatively, when the second digital certificate 118 comprise a device certificate, the certificate authority 106 may provide the second digital certificate 118 to the given communication device 104 upon request by the given communication device 104.

Figure 7:
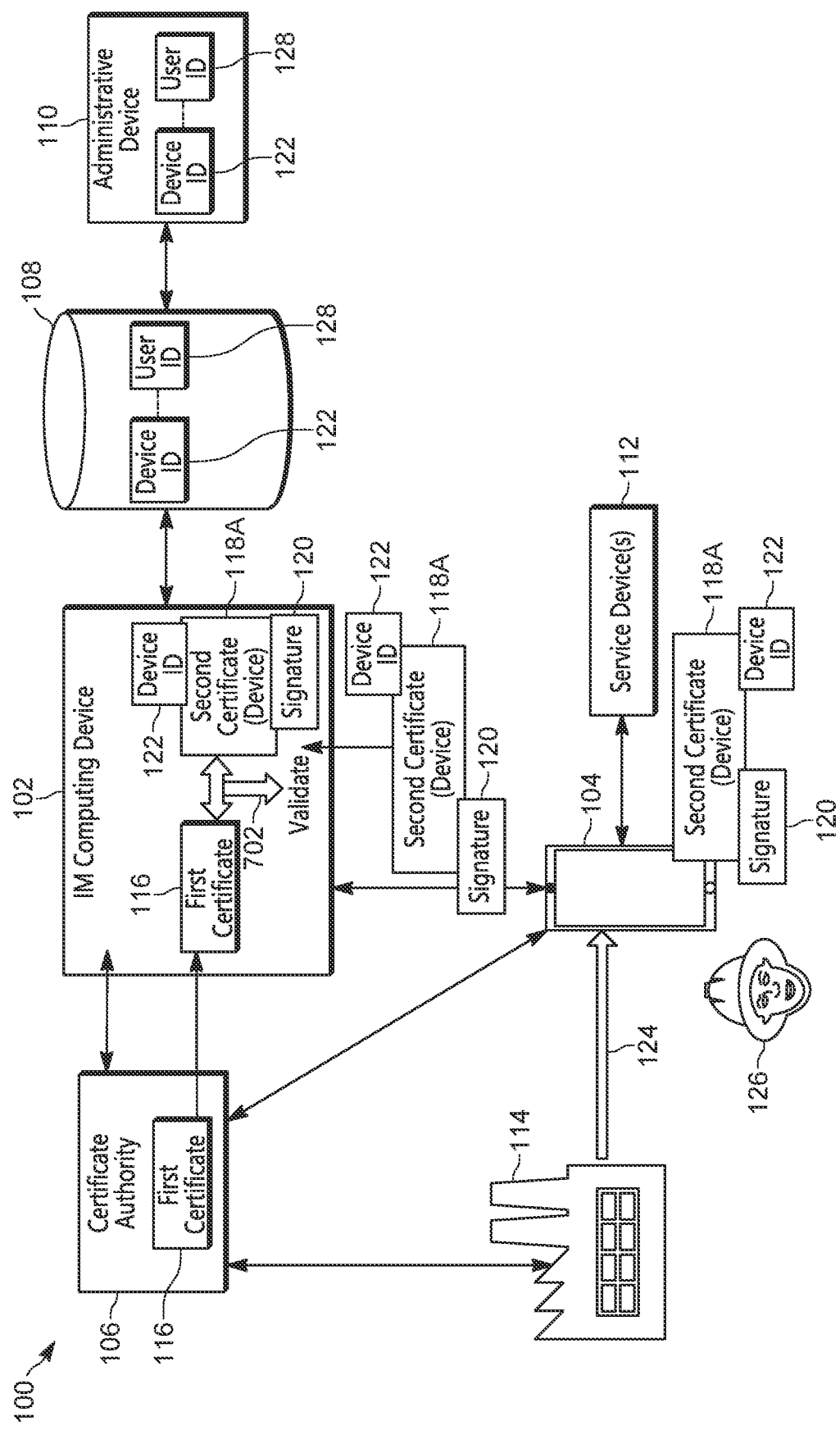
FIG. 7 depicts the system of FIG. 1 implementing aspects of a method to log a communication device into services using a device identifier, in accordance with some examples.
Figure 8:
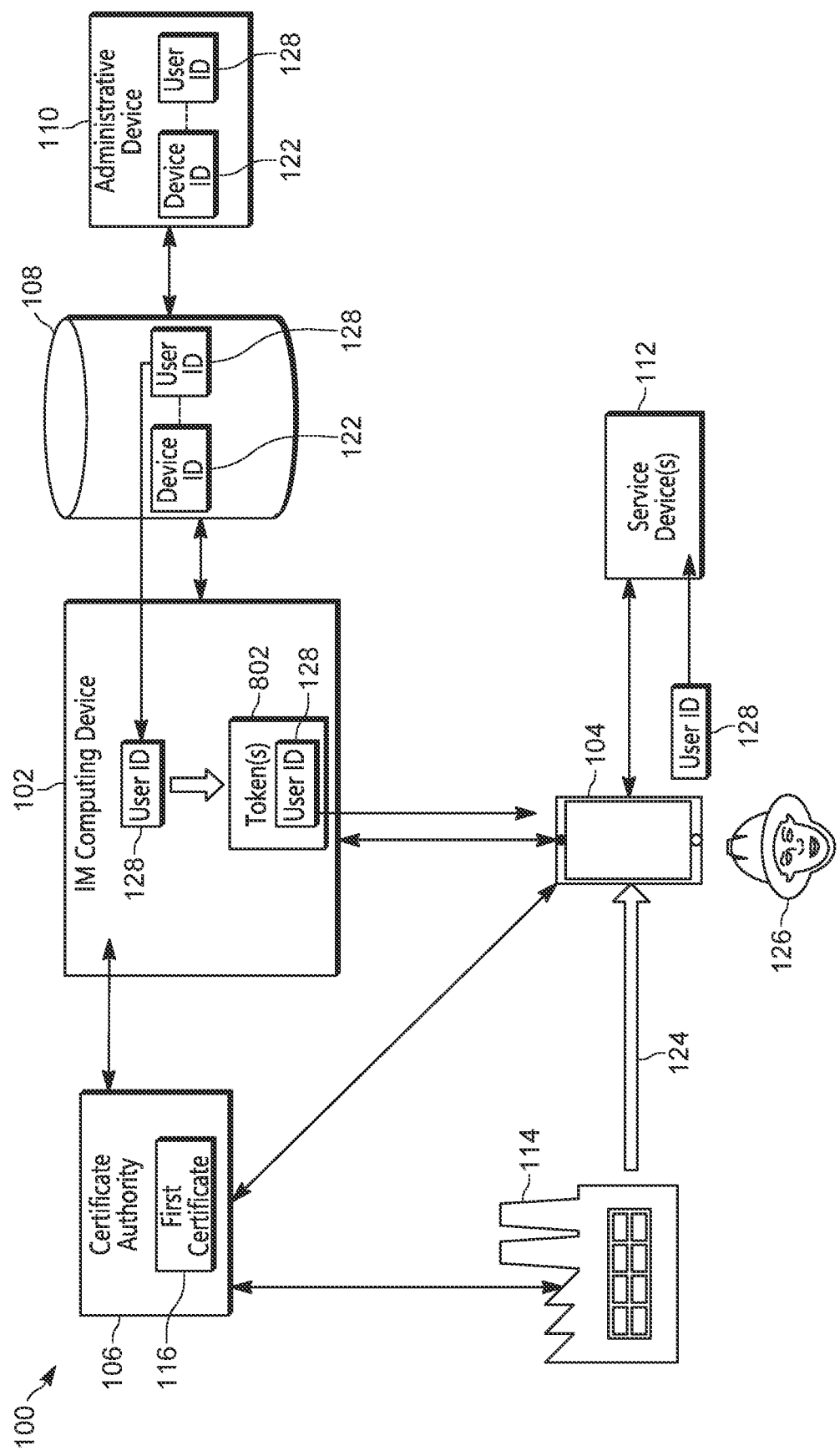
FIG. 8 depicts the system of FIG. 1 implementing further aspects of the method to log a communication device into services using a device identifier, in accordance with some examples.

Attention is next directed to FIG. 7 and FIG. 8, which depict aspects of the method 300 and the method 400. It is understood in FIG. 7 and FIG. 8 that the method 500 and the method 600 have already been implemented. FIG. 7 and FIG. 8 are similar to FIG. 1, with like components having like numbers. Furthermore, while for simplicity not all components of the system 100 are depicted in FIG. 7 and FIG. 8, such components are nonetheless understood to be present. For example, in FIG. 7, the second digital certificate 118B is not depicted at the given communication device 104, but the second digital certificate 118B is nonetheless understood to be present at the given communication device 104. Similarly, in FIG. 8, the second digital certificates 118A, 118B and the device identifier 122 are not depicted at the given communication device 104, but the second digital certificates 118A, 118B and the device identifier 122 are nonetheless understood to be present at the given communication device 104.

Attention is first directed to FIG. 7, in which the IM computing device 102 is receiving (e.g., at the block 302 of the method 300), the first digital certificate 116 from the certificate authority 106. FIG. 7 further depicts the IM computing device 102 receiving (e.g., at the block 304 of the method 300, and/or at the block 402 of the method 400), the second digital certificate 118B (e.g., a device certificate) with the device identifier 122.

FIG. 7 further depicts the IM computing device 102 validating (e.g., at the block 306 of the method 300) the second digital certificate 118 by determining that the second digital certificate 118A is signed using the first digital certificate 116. In particular, as depicted, the IM computing device 102 compares the first digital certificate 116 and the second digital certificate 118A and/or compares the signature 120 to the first digital certificate 116. Such a validation process is represented in FIG. 7 by arrows 702.

Attention is next directed to FIG. 8 which follows, in time, from FIG. 7, as depicted, in response to successfully validating the second digital certificate 118A, the IM computing device 102 obtains (e.g., at the block 308 of the method 300), from the memory 108, the user identifier 128 associated with the device identifier 122, for example by using the device identifier 122 received from the given communication device 104 in a database lookup at the memory 108.

The IM computing device 102 generates one or more tokens 802, which include the user identifier 128, and issues (e.g., at the block 310 of the method 300) the one or more tokens 802 to the given communication device 104. In particular the IM computing device 102 may generates one or more tokens 802, and embed the user identifier 128 into the one or more tokens The given communication device 104 receives the one or more tokens 802 (e.g., at the block 404 of the method 400), and uses the user identifier 128 of the one or more tokens 802 to log-in to one or more services (e.g., at the block 406 of the method 400). For example, as depicted, the given communication device 104 may provide the user identifier 128 to one or more of the service devices 112 in a log-in process. Alternatively, or in addition, the given communication device 104 may provide the user identifier 128 to one or more applications executed by the given communication device 104 in a log-in process.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, validate digital certificates, issue tokens, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at an identity management (IM) computing device, from a certificate authority, a first digital certificate;
   receiving, at the IM computing device, from a given communication device, a second digital certificate and a device identifier of the given communication device;
   validating, at the IM computing device, the second digital certificate using the first digital certificate;
   in response to successfully validating the second digital certificate, obtaining, at the IM computing device, from a memory storing device identifiers in association with respective user identifiers, a user identifier associated with the device identifier; and
   issuing, from the IM computing device, to the given communication device, one or more tokens that include the user identifier, the one or more tokens enabling the given communication device to log into one or more services using at least one of the user identifier and the one or more tokens,
   wherein the one or more tokens comprises:
      an initial access token enabling a log-in process at the given communication device such that the given communication device is initially logged into using the initial access token, and the one or more services are initially logged into using the initial access token.

2. The method of claim 1, wherein successfully validating the second digital certificate using the first digital certificate comprises:
   determining that the second digital certificate is signed using the first digital certificate.

3. The method of claim 1, wherein the first digital certificate comprises a root certificate.

4. The method of claim 1, wherein the second digital certificate comprises:
   a base certificate associated with the given communication device and issued by the certificate authority, the base certificate signed by the first digital certificate.

5. The method of claim 1, wherein the second digital certificate comprises:
   a device certificate associated with the given communication device and issued by the certificate authority, the device certificate comprising a digital certificate dedicated to providing the device identifier to the IM computing device, the device certificate signed by the first digital certificate.

6. The method of claim 1, wherein the one or more tokens further comprises:
   one or more refresh tokens used by the given communication device to remain logged into the one or more services after a current token expires.

7. An identity management (IM) computing device comprising:
   a communication interface;
   a controller; and
   a computer-readable storage medium having stored thereon program instructions that, when executed by the controller, cause the controller to perform a set of operations comprising:
      receiving, from a certificate authority, a first digital certificate;
      receiving, via the communication interface, from a given communication device, a second digital certificate and a device identifier of the given communication device;
      validating the second digital certificate using the first digital certificate;
      in response to successfully validating the second digital certificate, obtaining, from a memory storing device identifiers in association with respective user identifiers, a user identifier associated with the device identifier; and
      issuing, via the communication interface, to the given communication device, one or more tokens that include the user identifier, the one or more tokens enabling the given communication device to log into one or more services using at least one of the user identifier and the one or more tokens,
      wherein the one or more tokens comprises:
         an initial access token enabling a log-in process at the given communication device such that the given communication device is initially logged into using the initial access token, and the one or more services are initially logged into using the initial access token.

8. The IM computing device of claim 7, wherein successfully validating the second digital certificate using the first digital certificate comprises:
   determining that the second digital certificate is signed using the first digital certificate.

9. The IM computing device of claim 7, wherein the first digital certificate comprises a root certificate.

10. The IM computing device of claim 7, wherein the second digital certificate comprises:
    a base certificate associated with the given communication device and issued by the certificate authority, the base certificate signed by the first digital certificate.

11. The IM computing device of claim 7, wherein the second digital certificate comprises:

a device certificate associated with the given communication device and issued by the certificate authority, the device certificate comprising a digital certificate dedicated to providing the device identifier to the IM computing device, the device certificate signed by the first digital certificate.

12. The IM computing device of claim 7, wherein the one or more tokens further comprises:
one or more refresh tokens used by the given communication device to remain logged into the one or more services after a current token expires.

13. A system comprising:
a memory storing device identifiers in association with respective user identifiers;
an identity management (IM) computing device comprising: a first controller; and a first computer-readable storage medium having stored thereon first program instructions that, when executed by the first controller, cause the IM computing device to perform a first set of operations;
a given communication device comprising: a second controller; and a second computer-readable storage medium having stored thereon second program instructions that, when executed by the second controller, cause the given communication device to perform a second set of operations,
wherein the first set of operations comprises:
receiving, at the IM computing device, from a certificate authority, a first digital certificate;
receiving, at the IM computing device, from the given communication device, a second digital certificate and a device identifier of the given communication device;
validating, at the IM computing device, the second digital certificate using the first digital certificate;
in response to successfully validating the second digital certificate, obtaining, at the IM computing device, from the memory, a user identifier associated with the device identifier; and
issuing, from the IM computing device, to the given communication device, one or more tokens that include the user identifier; and
wherein the second set of operations comprises:
providing, from the given communication device, to the IM computing device, the second digital certificate and the device identifier;
receiving, at the given communication device, from the IM computing device, the one or more tokens that include the user identifier; and
logging into one or more services using at least one of the user identifier and the one or more tokens, wherein the one or more tokens comprises:
an initial access token enabling a log-in process at the given communication device such that the given communication device is initially logged into using the initial access token, and the one or more services are initially logged into using the initial access token.

14. The system of claim 13, further comprising:
an administrative device comprising: a third controller; and a third computer-readable storage medium having stored thereon third program instructions that, when executed by the third controller, cause the administrative device to perform a third set of operations, wherein the third set of operations comprises:
storing, at the memory, the user identifier in association with the device identifier.

15. The system of claim 13, further comprising:
the certificate authority comprising: a fourth controller; and a fourth computer-readable storage medium having stored thereon fourth program instructions that, when executed by the fourth controller, cause the certificate authority to perform a fourth set of operations, wherein the fourth set of operations comprises:
providing, from the certificate authority, to the IM computing device, the first digital certificate;
generating, at the certificate authority, the second digital certificate;
signing, at the certificate authority, the second digital certificate using the first digital certificate; and
providing, from the certificate authority, to the given communication device, the second digital certificate.

16. The system of claim 13, wherein successfully validating the second digital certificate using the first digital certificate at the IM computing device comprises:
determining that the second digital certificate is signed using the first digital certificate.

17. The system of claim 13, wherein the first digital certificate comprises a root certificate and the second digital certificate comprises one of:
a base certificate associated with the given communication device and issued by the certificate authority, the base certificate signed by the first digital certificate; or
a device certificate associated with the given communication device and issued by the certificate authority, the device certificate comprising a digital certificate dedicated to providing the device identifier to the IM computing device, the device certificate signed by the first digital certificate.

18. The system of claim 13, wherein the one or more tokens further comprises: one or more refresh tokens used by the given communication device to remain logged into the one or more services after a current token expires.

* * * * *